United States Patent Office 2,960,059
Patented Nov. 15, 1960

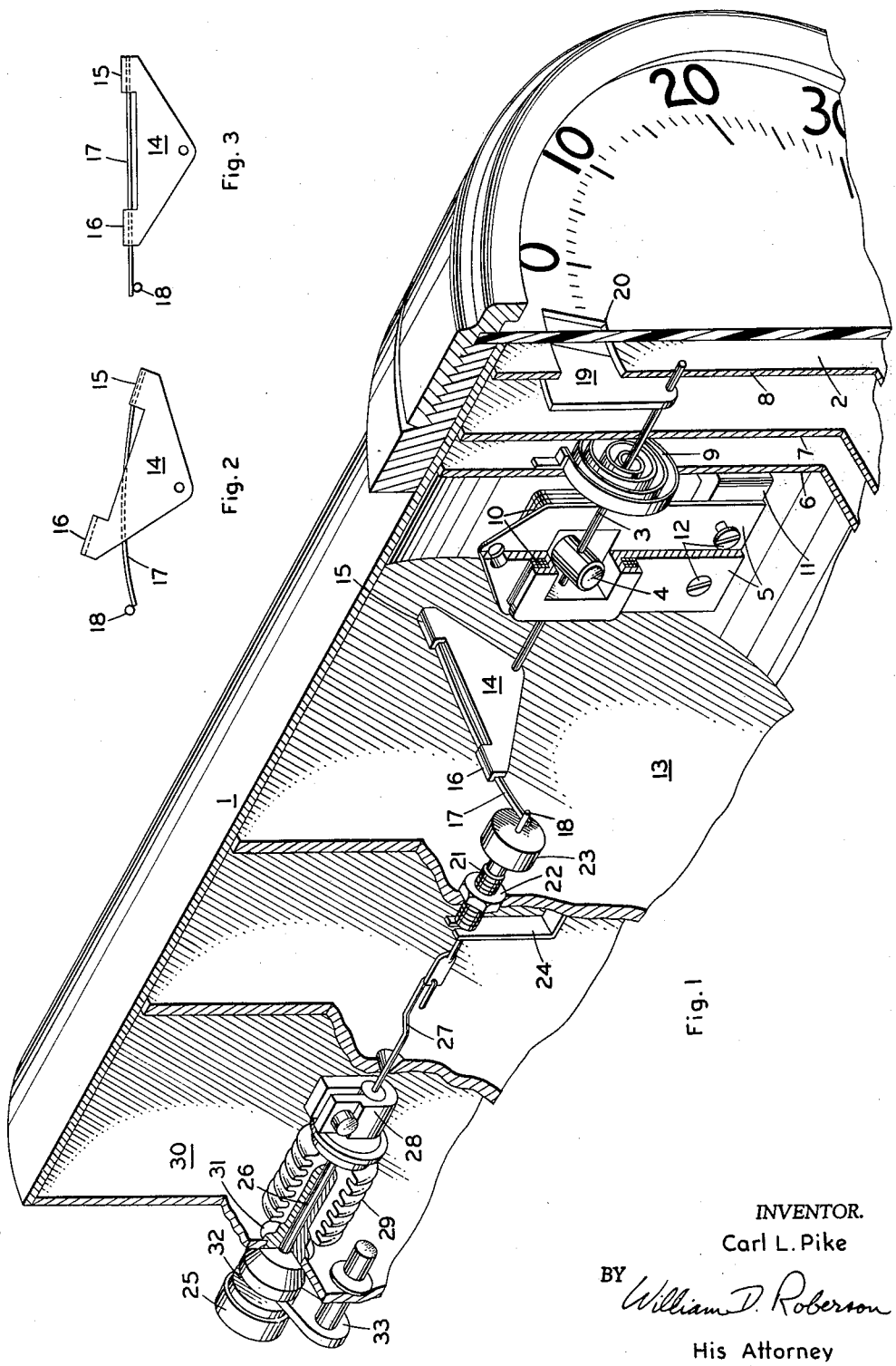

2,960,059

INSTRUMENT INDICATING ARRANGEMENTS

Carl L. Pike, Lynn, Mass., assignor to General Electric Company, a corporation of New York Filed Aug. 18, 1958, Ser. No. 755,558

7 Claims. (Cl. 116—129)

This invention relates to indicators for instruments, and more particularly to devices for giving an indication when the deflection of an instrument has exceeded a predetermined value.

In jet engines, many engine variables are indicated by electric instruments. It is desirable to provide a positive means of indicating when some of these variables, such as speeds and temperatures for example, exceed certain limits, because when they exceed such limits the useful life of the engine may be greatly reduced or its safety and reliability may be impaired, and it may be necessary to make extensive repairs on the engine. This invention provides a simple and reliable device for causing an indicator to give a signal when the deflection of an instrument has once exceeded a predetermined value and also makes provision for resetting the indicator after it has been observed. It is particularly adaptable to instruments for sensing variables in jet engines, but may also be used in any meter or instrument where it is desired that a signal be given when the instrument deflection exceeds a predetermined value. This invention has been found to be particularly useful for low torque instruments.

Accordingly, it is an object of this invention to provide an indicating arrangement to indicate that the deflection of an instrument has exceeded a predetermined value.

Another object is to provide such an indicating arrangement which may be easily reset after it has been observed.

A still further object is to provide a shaft lock which may be actuated by a low torque instrument without impairing its accuracy to permit an indication to be retained once the instrument has registered a reading in excess of a predetermined maximum value.

In carrying out the objects of this invention in accordance with one embodiment thereof, a supporting member or yoke is mounted for rotation with the shaft of a conventional meter movement. The supporting member carries an elongated resilient member in the form of a flat leaf spring arranged to engage a stop at a predetermined deflection in one direction. The supporting member is so constructed that upon movement in one direction the entire length of the leaf spring is permitted to flex so as to pass by the stop, whereas upon return movement of the shaft a portion of the supporting member engages the leaf spring intermediate its ends and limits the flexing thereof, thereby preventing return movement of the leaf spring past the stop. An indicator is provided to indicate movement of the resilient member past the stop in the one direction and the blocking of the return movement causes retention of the indicator until the meter is reset. Provision is made for movement of the stop to reset the indicator into its normal position after the indication of excessive movement of the shaft has been noted.

While it is not intended that this invention be limited to the specific embodiment shown and described, a better understanding of it may be gained by reference to the accompanying drawings.

Figure 1 is a pictorial view, partly in section, of an instrument employing the indicator device of this invention.

Figure 2 shows the action of the spring and yoke member as the spring passes the stop pin.

Figure 3 shows the action of the spring and yoke member upon return movement.

Figure 1 shows a conventional meter housing 1 which has at one end of it a face 2 marked with any suitable scale to indicate the deflection of the instrument. Centrally located within the housing is a conventional meter movement which has connected to it an instrument indicator which moves across the scale on the meter face 2. Neither the meter movement nor the instrument indicator is shown on the drawings as they are not important to this invention and any conventional elements could be used. Mounted above the meter movement is an auxiliary meter movement which is the subject of this invention, and which is connected through any suitable transducer, to be responsive to an engine variable, for example speed or temperature.

The auxiliary meter movement includes an auxiliary meter shaft 3, which carries on it a conventional meter rotor 4, here shown as a permanent magnet rotor. This shaft is journaled in aligned holes in the non-magnetic coil forms 5 and extends through all three partitions 6, 7 and 8 in the housing at its other end. A spiral ring 9 is provided to bias the shaft 3 counterclockwise toward its down-scale position. The field coils 10 of the auxiliary meter are mounted on the coil forms 5, which are secured in turn to frame 11 by screws 12.

Just short of the partition 13, a supporting member or yoke 14 is mounted on the shaft 3 to rotate therewith. The yoke 14 is formed to include tabs 15 and 16 which are employed to support and coact with an elongated resilient member 17 constituted in this instance by a flat leaf spring. The elongated resilient member 17 is mounted at one end to the tab 15 so that it passes beneath tab 16 and its free end extends outwardly beyond the end of the yoke 14. The free end describes an arc when the yoke 14 and the resilient member 17 rotate with the shaft 3.

In order to define a limit to the free rotation of the shaft 3, a stop member in the form of a pin 18 is mounted in the path of travel of the free end of the elongated resilient member 17. The position of this stop pin 18 identifies the maximum desired deflection of the shaft 3 during normal operation; it is mounted in such a way that the free end of the elongated resilient member 17 abuts against the stop pin 18 when this maximum desired deflection in a clockwise direction, as viewed in Figure 1, has been achieved.

The elongated resilient member 17 is arranged so that when the desired maximum deflection is exceeded, the resilient member 17 may flex to permit movement beyond the stop pin 18. As the shaft 3 rotates beyond the desired maximum deflection, the elongated resilient member 17 flexes, as best illustrated in Figure 2. As the member 17 continues to flex during further rotation of the shaft, the end of member 17 eventually slips past the stop pin 18. Due to the relatively long free length of the resilient member 17 during movement in the clockwise direction, it is relatively flexible, and the torque required to cause it to flex and pass the stop pin in a clockwise direction is not so great as to impair the accuracy of the instrument even when a low torque instrument is used.

After the resilient member has passed the stop pin 18, it will be prevented from returning to its initial position. Thus, as shown in Figure 3, the stop pin 18 is again in the path of the free end of the resilient member 17 when the shaft 3 is rotating in a counterclockwise direction toward its initial position after having passed stop pin 18. When the resilient member 17 abuts against the stop pin 18, the torque which is causing the shaft to rotate, that is the bias provided by the spring 9, attempts to flex the resilient member 17 to cause it to pass the stop pin 18. However, in this direction of movement of the shaft 3, the flexing of the resilient member 17 must be in a direction opposite to that occurring during the clockwise movement of the shaft 3.

In accordance with my invention provision is made for reducing the flexibility of the resilient member 17 under these circumstances to prevent return movement beyond the stop pin 18. Specifically the resilient member 17 is caused to be engaged by the overlapping tab 16 thereby decreasing the effective free length of the resilient member 17 to the length thereof between tab 16 and the stop pin 18. During the clockwise movement, the effective length of the member 17 is that between the mounting tab 15 and the stop pin 18. This reduction in the free length of the resilient member 17 has the effect of greatly reducing its flexibility, and the torque applied to the shaft 3 by the spring 9 is not adequate to flex the resilient member 17 to cause it to pass the stop pin 18. Thus, the shaft 3, when it has exceeded a certain predetermined maximum desired deflection, is prevented from returning to its initial position.

In the embodiment shown, the resilient member 17 is mounted eccentrically with respect to the shaft 3. By mounting the resilient member 17 in this way, a component of force which is tangential, as well as a radial component of force, is applied to the stop pin 18, and this tangential component of force makes it easier for the resilient member 17 to pass the stop pin 18 when the meter is moving in an up-scale direction.

In order to provide a positive indication of movement of the meter beyond the maximum desired deflection, an indicator 19 is mounted on the shaft 3 and fixed to rotate with the shaft. A window 20 is provided in the face 2 of the instrument, and the indicator 19, which is normally concealed behind the meter face 2, is so positioned on the shaft 3 that when the shaft is prevented from returning to its initial position by the cooperation of the resilient member 17 and the stop pin 18, the indicator is visible through the window 20. The indicator 19 becomes visible through the window 20 any time that the deflection of the shaft 3 approaches its desired maximum, but it will be fixed in this position only when the deflection of the shaft 3 has exceeded the maximum and is prevented from returning to its initial position.

Provision is made for resetting the indicator 19 after the excessive condition indicated by the indicator 19 has been observed. This is accomplished by moving the stop pin 18 out of the path of the free end of the resilient member 17. For this purpose, the stop pin 18 is mounted to move axially in a sleeve 21 which is secured to dividing partition 13 by any suitable securing means, here shown as lock nut 22. The stop pin 18 is provided with an enlarged flange 23 which limits its axial movement in sleeve 21, and it is biased into the path of the resilient member 17 by a leaf spring 24. When it is desired to reset the instrument, the stop pin 18 is moved against the bias of the spring 24 to a position out of the path of the resilient member 17, thus permitting the resilient member to return to its initial position.

In order to effect such movement of the stop pin a knob 25 is provided on the exterior of the housing. The knob is connected to the stop pin 18 through a shaft 26, an elongated member 27 and an intermediate clamp 28. A bellows 29 is provided for sealing of the housing while at the same time permitting movement of the knob for resetting. The bellows is mounted to the back wall 30 of the housing by means of a bushing 31.

In order to prevent unintentional movement of the stop pin 18, the knob includes a groove 32, and a pawl 33, pivotally mounted on the housing, is arranged to engage the groove 32.

It is to be understood that this invention is not limited to any particular relative position of the two meter movements. The movements could be disposed in other relative positions in the meter housing, and it would be possible even to have the shafts coaxial and the movements acted upon by the same magnetic field, or to have the shafts coaxial and the movements acted upon by separate magnetic fields. In the embodiment shown, the two separate movements could record the same or different variables; for example, one might record speed and the other temperature, or they could both record either speed or temperature.

The operation of the indicator device is as follows: The rotor 4 is acted upon by a magnetic field applying a clockwise torque to the shaft 3 and causing it to rotate against the bias of spring 9. As the deflection of the shaft reaches a limit corresponding to a maximum safe condition, the free end of the elongated resilient member 17 abuts against stop pin 18. This limit is not the absolute maximum deflection of the instrument, but is the maximum desired deflection; and if this deflection is exceeded, the device is adapted to indicate this fact. Continued deflection beyond the maximum desired deflection causes the resilient member 17 to flex and eventually its free end slips beyond the stop pin 18.

When the shaft 3 reutrns toward its initial position under the influence of spring 9 after having passed the desired maximum, the free end of the resilient member 17 again abuts against the stop pin 18. The bias of spring 9 attempts to flex resilient member 17 again to cause it to pass stop pin 18, but this time the flexure must be in the opposite direction. When the resilient member 17 attempts to flex in this direction, it is engaged by tab 16 on the yoke 14, and this engagement reduces the free length of the resilient member 17, thus greatly reducing its flexibility. With the flexibility thus reduced the bias of spring 9 is not sufficient to flex the resilient member 17 to cause it to pass stop pin 18, so the shaft is locked in a position such that indicator 19 remains visible through window 20, thus showing that the maximum desired deflection has been exceeded. When the indicator 19 has been observed, the instrument may be reset by moving the stop pin 18 out of the path of resilient member 17 through the use of knob 25.

While this device may be used with a wide variety of instruments, it has been found to be particularly useful in connection with low torque meters since very little or no additional load is imposed on the meter movement by this device during normal operation, and therefore the accuracy of the instrument is not affected.

While a particular embodiment of this invention has been shown and described, other modifications will occur to those skilled in the art. It is to be understood therefore that this invention should not be limited except by a fair interpretation of the appended claims which are intended to cover all modifications which do not depart from the spirit and scope of this invention.

What I claim as new and desire to secure by Letters Patent of the United States is:

1. A shaft lock for an instrument comprising: a shaft angularly deflectable from an initial position in response to torque imparted thereto; means biasing said shaft toward its initial position; and means for preventing return of said shaft to its initial position when the angular deflection thereof has exceeded a predetermined angular limit, said last-named means including an elongated resilient member fixed to rotate with said shaft and having a free end which describes an arc about said shaft when said shaft rotates, a stop member arranged in the path of travel of the free end of said elongated resilient member, and means to reduce the flexibility of said elongated resilient member relative to said stop member when said shaft is moving toward its initial position.

2. An indicating arrangement for an instrument comprising: a shaft rotatable by said instrument; an elongated resilient member mounted with one end fixed with respect to said shaft for rotation therewith; a stop member disposed in the path of the free end of said resilient member, said resilient member flexing during rotation of said shaft in one direction to afford movement of said resilient member beyond said stop; means engaging said resilient member intermediate its ends for reducing the flexibility thereof during return movement of said resilient member for preventing movement of said resilient member past said stop member; and an indicator mounted on said shaft and movable into an indicating position upon movement of said resilient member beyond said stop member and retained in said position by engagement of said resilient member by said stop member during said return movement.

3. An indicating arrangement for an instrument comprising: a shaft rotatable by said instrument; an elongated resilient member mounted with one end fixed with respect to said shaft for rotation therewith; a movable stop member disposed in the path of the free end of said resilient member, said resilient member flexing during rotation of said shaft in one direction to afford movement of said resilient member beyond said stop member; means engaging said resilient member intermediate its ends for reducing the flexibility thereof during return movement of said resilient member for preventing movement of said resilient member past said stop member; an indicator mounted on said shaft and movable into an indicating position upon movement of said resilient member beyond said stop member and retained in said position by engagement of said resilient member by said stop member during said return movement; and means for moving said stop member out of the path of the free end of said resilient member for permitting return movement of said shaft to its initial position after the position of said indicator has been observed.

4. An indicator lock for an instrument comprising: a shaft angularly deflectable from an initial position in response to torque imparted thereto; means biasing said shaft toward its initial position; and means for preventing return of said shaft to its initial position when the angular deflection thereof has exceeded a predetermined angular limit, said last-named means including a yoke fixed to rotate with said shaft, an elongated resilient member carried by said yoke and having a free end which describes an arc about said shaft when said shaft rotates, a stop member arranged in the path of travel of the free end of said resilient member, and means to reduce the flexibility of said resilient member relative to said stop member when said shaft is moving toward its initial position so that said resilient member may flex and pass said stop member when said shaft is moving away from its initial position, but will be prevented from passing said stop member during return movement of said shaft toward its initial position.

5. A shaft lock for an instrument comprising: a shaft angularly deflectable from an initial position in response to low torques imparted thereto; means resiliently biasing said shaft toward its initial position; and means for preventing return of said shaft to its initial position when the angular deflection thereof has exceeded a predetermined angular limit, said last-named means including a yoke fixed to rotate with said shaft, an elongated resilient member having one end fixed on said yoke and a free end arranged to describe an arc about said shaft in response to deflection of said shaft and yoke, a stop pin arranged in the path of travel of the free end of said resilient member to engage said resilient member and to cause it to flex when said shaft approaches said angular limit of its travel, whereupon continued deflection of said shaft past said limit causes said resilient member to slip beyond said stop pin, and a projection on said yoke disposed to engage aid resilient member intermediate its ends upon reverse flexure thereof, whereby said restraining means is prevented from returning said shaft to its initial position after said shaft has passed the predetermined angular limit of its travel.

6. An indicating arrangement for an instrument comprising: a shaft angularly deflectable from an initial position in response to low torques applied thereto; means resiliently restraining angular deflection of said shaft from its initial position; means for preventing return of said shaft to its initial position when the angular deflection thereof has exceeded a predetermined angular limit, said last-named means including a yoke fixed to rotate with said shaft, an elongated resilient member having one end fixed on said yoke and a free end arranged to describe an arc about said shaft in response to deflection of said shaft and yoke, an axially movable stop pin arranged in the path of travel of the free end of said resilient member to engage said resilient member and to cause it to flex when said shaft approaches said angular limit of its travel, whereupon continued deflection of said shaft past said limit causes said resilient member to slip beyond said stop pin, a projection on said yoke disposed to engage said resilient member intermediate its ends upon reverse flexure thereof, thereby shortening the effective length and reducing the flexibility thereof, whereby said restraining means is prevented from returning said shaft to its initial position after said shaft has passed the predetermined angular limit of its travel; an indicator mounted on said shaft; means normally concealing said indicator, said indicator being moved into a visible position when the shaft deflection exceeds said predetermined angular limit and being prevented from returning to its initial position; and means to move said stop pin axially out of the path of travel of the free end of said resilient member whereby said indicator may be reset to its initial position.

7. A shaft lock for an instrument comprising: a shaft angularly deflectable from an initial position in response to low torques imparted thereto; means resiliently restraining angular deflection of said shaft from its initial position; and means for preventing return of said shaft to its initial position when the angular deflection thereof has exceeded a predetermined angular limit, said last-named means including a yoke fixed to rotate with said shaft, an elongated resilient member mounted on said yoke eccentrically with respect to said shaft and having one end fixed on said yoke and a free end arranged to describe an arc about said shaft in response to deflection of said shaft and yoke, a stop pin arranged in the path of travel of the free end of said resilient member to engage said resilient member and to cause it to flex when said shaft approaches said angular limit of its travel, whereupon continued deflection of said shaft past said limit causes the end of said resilient member to slip beyond said stop pin, and a projection on said yoke disposed to engage said resilient member intermediate its ends upon reverse flexure thereof, thereby shortening the effective length and reducing the flexibility thereof, whereby said restraining means is prevented from returning said shaft to its initial position after said shaft has passed the predetermined angular limit of its travel.

References Cited in the file of this patent

UNITED STATES PATENTS 2,878,775    Taylor  ---------------- Mar. 24, 1959

FOREIGN PATENTS 757,253    Great Britain ----------- Sept. 19, 1956